US008897464B2

(12) United States Patent
Akino

(10) Patent No.: US 8,897,464 B2
(45) Date of Patent: Nov. 25, 2014

(54) CONDENSER MICROPHONE

(75) Inventor: Hiroshi Akino, Tokyo (JP)

(73) Assignee: Kabushiki Kaisha Audio-Technica, Tokyo (JP)

( * ) Notice: Subject to any disclaimer, the term of this patent is extended or adjusted under 35 U.S.C. 154(b) by 282 days.

(21) Appl. No.: 13/408,288

(22) Filed: Feb. 29, 2012

(65) Prior Publication Data

US 2012/0224723 A1 Sep. 6, 2012

(30) Foreign Application Priority Data

Mar. 4, 2011 (JP) ................................. 2011-047216

(51) Int. Cl.
*H04R 3/00* (2006.01)
*H04B 15/00* (2006.01)
*H04R 3/04* (2006.01)

(52) U.S. Cl.
CPC .............. *H04R 3/04* (2013.01); *H04R 2410/00* (2013.01)
USPC ........... 381/113; 381/114; 381/111; 381/122; 381/94.9

(58) Field of Classification Search
USPC ........ 381/111, 113, 114, 94.9, 122, 173, 174, 381/170, 157, 124, 94.1, 95
See application file for complete search history.

(56) References Cited

U.S. PATENT DOCUMENTS 4,442,323 A * 4/1984 Yoshida et al. ............... 381/113
5,363,452 A * 11/1994 Anderson ....................... 381/91
6,226,386 B1 * 5/2001 Akino ........................... 381/173
7,697,699 B2 * 4/2010 Ozawa .......................... 381/94.1
2012/0076322 A1 * 3/2012 Kimura et al. .............. 381/94.9

FOREIGN PATENT DOCUMENTS

JP 2520929 5/1996

* cited by examiner

*Primary Examiner* — Vivian Chin
*Assistant Examiner* — David Ton
(74) *Attorney, Agent, or Firm* — Whitham Curtis Christofferson & Cook, PC

(57) ABSTRACT

A condenser microphone includes a condenser microphone unit and a piezoelectric element. The piezoelectric element is disposed so as to generate piezoelectric signals in response to vibration causing the unit to generate vibratory noise signals. The piezoelectric signals are inputted through a low-pass filter and a level adjuster circuit to the unit to drive a diaphragm of the unit. The vibratory noise signals generated by the vibration in the unit are canceled with the piezoelectric signals generated by the piezoelectric element.

10 Claims, 2 Drawing Sheets

RELATED ART

CONDENSER MICROPHONE

TECHNICAL FIELD

The present invention relates to a condenser microphone, and in particular, to a prevention of vibratory noise in a directive condenser microphone.

BACKGROUND ART

Mechanical vibration applied to a main body of a microphone causes vibration of a microphone unit to convert the vibration into vibratory noise signals in the microphone unit. The vibratory noise signals are mixed into original audio signals converted in the microphone unit. The mechanical vibration applied to the main body includes impactive vibration such as fall or collision, continuous vibration due to mechanical motion of an apparatus containing the microphone, and vibration due to friction on the main body.

A condenser microphone is a type of microphone. Vibratory noise signals are generated in response to vibration applied to a first-order pressure-gradient microphone having cardioid or hyper-cardioid unidirectivity, omnidirectional unidirectivity, or bidirectivity. In particular, in a narrow-directivity condenser microphone including an acoustic tube, mechanical vibration of its main body causes the mass of air in the acoustic tube to be applied to a diaphragm, and the inertia of the mass of the air moves the diaphragm to generate large vibratory noise signals. In the first-order pressure-gradient condenser microphone, the amplitudes of vibratory noise signals are significantly different depending on its directivity, increase with bidirectivity, and decrease with omnidirectivity.

In the narrow-directivity condenser microphone including the acoustic tube, its narrow-directivity decreases in a low-frequency range depending on the length of the acoustic tube. The acoustic tube is designed so as to have a practical length, to operate as a first-order pressure-gradient component in a low-frequency range in which its narrow-directivity decreases, and to have its narrow-directivity even in a low-frequency range. Vibratory noise causes vibratory force due to the mass of air moving together with the diaphragm in addition to vibration of the diaphragm of a microphone unit. A longer acoustic tube therefore increases the vibratory noise.

As described above, the vibratory noise generated in the condenser microphone depends on its directivity, which is also described in Japanese Patent No. 2520929. Japanese Patent No. 2520929, in FIG. 7, describes differences in the sensitivity of microphones to mechanical vibration among bidirective, unidirective, and omnidirectionally unidirective microphones with reference to an omnidirective microphone. As is apparent from FIG. 7 in Patent No. 2520929, the sensitivity to vibration in a middle-frequency range is the highest in the bidirective microphone and decreases in the order of the unidirective, omnidirectionally unidirective, and omnidirective microphones.

Japanese Patent No. 2520929 also describes mechanical vibration absorption for a condenser microphone. In detail, a main body or a microphone unit of the microphone is supported with viscoelastic rubber to mechanically isolate the main body from the microphone unit. Mechanical vibration absorption up to a low-frequency range by a mechanical structure however results in impractical waggly support of the microphone unit through flexible viscoelastic material.

Japanese Patent No. 2520929 therefore proposes a condenser microphone including a piezoelectric vibration pickup for detecting vibratory noise, a condenser microphone unit, means for mechanical vibration absorption including a first vibration absorption mechanism and a second vibration absorption mechanism for supporting the pickup, and means for electric cancel including an amplitude/phase characteristic corrector circuit and a level corrector circuit for correcting an amplitude and a phase of output signals of the pickup so as to equalize the amplitude and the phase to an amplitude and a phase of output signals of the condenser microphone unit and a differential circuit for receiving the output signals of the condenser microphone unit and the output signals of the level corrector circuit to output differential output signals of these output signals.

FIG. 2 illustrates an exemplary circuit of a conventional condenser microphone, which is substantially the same as a circuit of the condenser microphone described in Japanese Patent No. 2520929. In FIG. 2, audio signals electro-acoustically converted in the condenser microphone unit 7 are converted into low impedance by an impedance converter circuit 8 including an FET 9 as a main circuit element and are outputted. Vibratory noise signals detected by a piezoelectric vibration pickup 10 are converted into low impedance by an impedance converter circuit 11 including an FET 111 as a main circuit element and are outputted. The impedance-converted vibratory noise signals are adjusted to a level that corresponds to the level of the audio signals with the level corrector circuit 12 including a variable resistor 121 (for adjusting levels) and are then inputted to a buffer amplifier 13 including an FET 131 as a main circuit element. Output signals of the buffer amplifier 13 are outputted through a low-pass filter 14 including a variable resistor 141, an electrolytic capacitor 142, and a capacitor 143. The variable resistor 141 and the electrolytic capacitor 142 are connected between an input terminal and an output terminal of the low-pass filter 14 in series, and a connection node between the variable resistor 141 and the electrolytic capacitor 142 is connected to the ground GND through the capacitor 143.

Audio signals outputted from the microphone unit 7 through the impedance converter circuit 8 are outputted through a buffer 15 including a transistor 151 having emitter-follower connection as a main circuit element. Vibratory noise signals are outputted from the piezoelectric vibration pickup 10 through the impedance converter circuit 11, the level corrector circuit 12, the buffer amplifier 13 and the low-pass filter 14 and then are outputted through a buffer 16 including a transistor 161 having emitter-follower connection as a main circuit element. This circuitry is connected to an external circuit through a connector including three pins. Of the three pins, a first pin 21 is connected to the ground, a second pin 22 to the emitter of the transistor 151 in the buffer amplifier 15, and a third pin 23 to the emitter of the transistor 161 in the buffer amplifier 16. Hot and cold signals of a balanced output are outputted from the second and third pins 22 and 23, respectively.

The first, second, and third pins 21, 22, and 23 are connected to a mixer through a cable. The mixer is not shown in the drawing. The mixer includes a phantom power supply and a differential circuit for outputting differential signals of audio signals from the microphone unit 7 and vibratory noise signals from the piezoelectric vibration pickup 10. The differential circuit is disposed in a head amplifier of the mixer and receives reversed-phase signals of the vibratory noise signals as a balanced input to thereby subtract the audio signals from the vibratory noise signals. The vibratory noise generated by the vibration is canceled with the vibratory noise signals.

The input of the mixer cannot cancel the vibratory noise signals without maintain the balance between the hot and cold signals. In the example circuit shown in FIG. 2, the level corrector circuit 12 is thus used to correct the level of the vibratory noise signals so as to corresponds to the level of the audio signals. The variable resistor 141 for adjusting the characteristics of the low-pass filter 14 is used to match the low-pass filter 14 with the frequency characteristics of the vibratory noise signals to be canceled. The piezoelectric vibration pickup can generate an output having a constant level in response to constant acceleration independently of a change in a frequency. In contrast to that, the level of the vibratory noise signals generated in the microphone decreases with a higher frequency in a frequency band in which sound pressure sensitivity is flat. The vibratory noise signals detected by the piezoelectric vibration pickup 10 are processed with the low-pass filter 14 to have a similar frequency response to that of the vibratory noise signals generated with the microphone unit 7. The level of the vibratory noise signals is matched with the level of the vibratory noise signals generated with the microphone unit 7 to thereby cancel the vibratory noise signals.

SUMMARY OF INVENTION

Technical Problem

Japanese Patent No. 2520929 also describes means for mechanical cancel in addition to means for electrically canceling vibratory noise. It is however preferable that noise can be canceled with only an electric canceller circuit if possible. Additionally, an invention disclosed in Japanese Patent No. 2520929 requires a differential circuit for the electric canceller circuit. The differential circuit needs a differential amplifier or an adder for adding one reversed-phase signal to the other signal. The differential amplifier or an adder generally includes a complicated circuit, which causes an increase in cost. A condenser microphone is therefore awaited which can electrically cancel vibratory noise without a differential amplifier and an adder.

It is an object of the present invention to solve the problems on the known techniques described above, in other words, to provide a condenser microphone that can electrically cancel vibratory noise only with an electric canceller circuit and without a differential amplifier and an adder.

Solution to Problem

A condenser microphone in accordance with an embodiment of the present invention includes a condenser microphone unit and a piezoelectric element, the piezoelectric element being disposed so as to generate piezoelectric signals in response to vibration causing the unit to generate vibratory noise signals, the piezoelectric signals being inputted through a low-pass filter and a level adjuster circuit to the unit to drive a diaphragm of the unit, the vibratory noise signals generated by the vibration in the unit being canceled with the piezoelectric signals generated by the piezoelectric element.

Advantageous Effects of Invention

The present invention provides a condenser microphone that can prevent vibratory noise without a differential amplifier and an adder/subtractor circuit.

DESCRIPTION OF EMBODIMENTS

Figure 1:
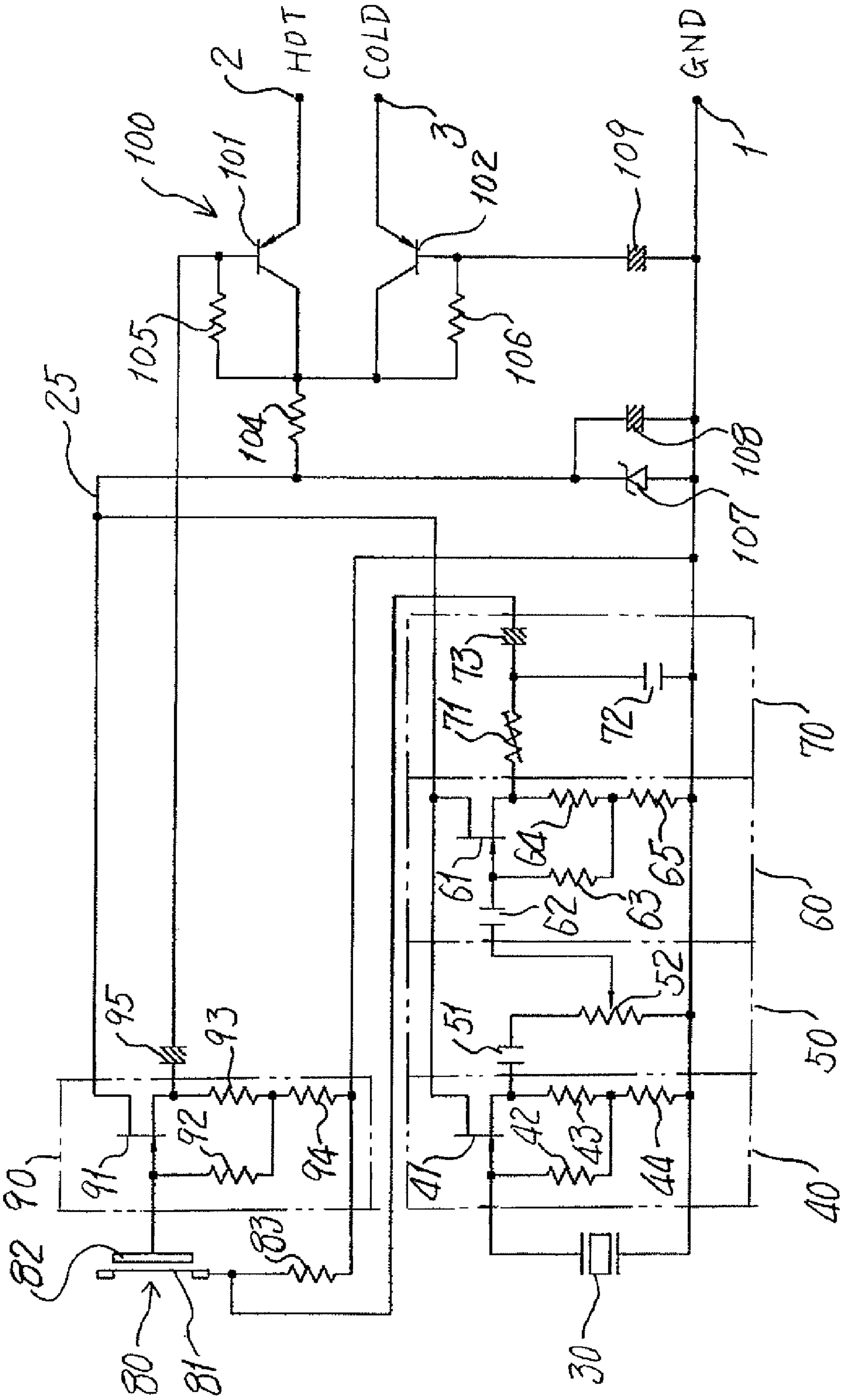
FIG. 1 is a circuit diagram illustrating a condenser microphone in accordance with the present invention.
Figure 2:
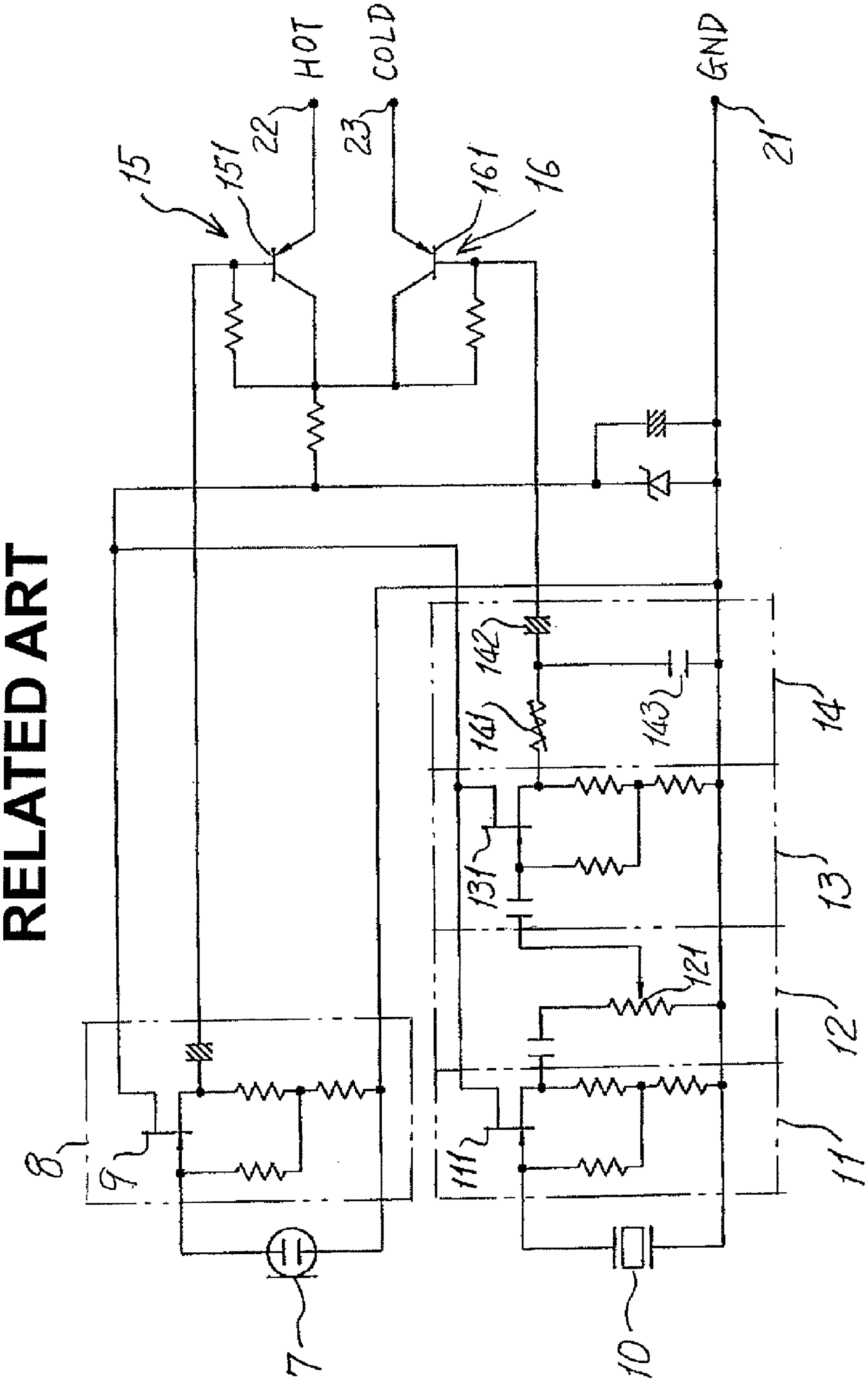
FIG. 2 is a circuit diagram illustrating a typical conventional condenser microphone.

A condenser microphone in an embodiment of the present invention will now be described with reference to FIG. 1.

The condenser microphone in the embodiment shown in FIG. 1 includes a condenser microphone unit (hereinafter referred to as "microphone unit") 80 and a piezoelectric element 30. The microphone unit 80 composed of thin membranes includes a diaphragm 81 for vibrating by receiving sound waves, and a fixed electrode 82 facing the diaphragm 81 with a short gap. The diaphragm 81 and the fixed electrode 82 function as electrodes of a capacitor. The diaphragm 81 vibrates in response to received sound waves to change the gap between the diaphragm 81 and the fixed electrode 82, and the capacitance of this capacitor is varied and is converted into audio signals as electric signals corresponding to the sound waves.

The piezoelectric element 30 has a basic configuration including a piezoelectric substance sandwiched by two electrodes, generates a voltage between the electrodes by receiving force in the laminating direction of the piezoelectric substance and the electrodes, and inversely generates stretching force by receiving a voltage between the electrodes. In this embodiment, the piezoelectric element 30 generates piezoelectric signals in response to vibration causing the microphone unit 80 to generate vibratory noise signals. A first end (one surface) and a second end (opposite surface to the first end) of the piezoelectric element 30 are respectively fixed to a unit case of the microphone unit 80 and to a weight. If the microphone unit 80 receives vibration due to, for example, impactive force to a main body of the microphone containing the microphone unit 80, force corresponding to the amplitude of the vibration is applied to the weight of the piezoelectric element 30 and is applied to the piezoelectric element 30 to generate piezoelectric signals corresponding to the amplitude of the vibration. The weight is fixed to the piezoelectric element 30 so as to generate acceleration in the direction of the vibration causing the condenser microphone unit 80 to generate the vibratory noise signals.

The microphone unit 80 has the diaphragm 81 connected through a resistor 83 to the ground and outputs audio signals from the fixed electrode 82 to an impedance converter circuit 90. The impedance converter circuit 90 includes an FET 91 as a main circuit element, and the FET 91 has a gate receiving audio signals. The FET 91 has a drain connected to a power line 25 and a source connected through resistors 93 and 94 to the ground. The gate of the FET 91 is connected through a resistor 92 to a connection node between the resistors 93 and 94. Audio signals converted into low impedance by the impedance converter circuit 90 are outputted from the source of the FET 91 through an electrolytic capacitor 95.

The impedance-converted audio signals are outputted through a buffer 100 as a balanced output. The buffer 100 includes two transistors 101 and 102 as main circuit elements. The transistors 101 and 102 have emitter-follower connections, collectors thereof are each connected through a resistor 104 to the power line 25, and the transistor 101 has a base receiving audio signals through the electrolytic capacitor 95. The transistor 101 has a collector connected to its base through a resistor 105 and has an emitter connected to a second pin 2 of a connector to output hot signals of a balanced output. The transistor 102 has a base connected through an electrolytic capacitor 109 to the ground. The transistor 102 has a collector connected to its base through a resistor 106 and has an emitter connected to a third pin 3 of the connector to output cold signals of the balanced output. The standardized 3-pin connector includes a first pin 1, the second pin 2, and the third pin 3 and connects the microphone to an external circuit such as a mixer The power line 25 is connected to the ground through a constant voltage diode 107 to hold a stable constant voltage. The constant voltage diode 107 is connected to an electrolytic capacitor 108 in parallel. The power line 25 is connected to a DC power supply not shown in the drawing to have a proper DC voltage applied thereto.

One electrode of the piezoelectric element 30 is connected to the ground, and piezoelectric signals are outputted from the other electrode. The piezoelectric signals are inputted to the diaphragm 81 of the microphone unit 80 through an impedance converter circuit 40, a level adjuster circuit 50, a buffer amplifier 60, and a low-pass filter 70 in this order so as to drive the diaphragm 81.

The impedance converter circuit 40 includes an FET 41 as a main circuit element, and the FET 41 has a gate receiving piezoelectric signals outputted from the piezoelectric element 30. The FET 41 has a drain connected to the power line 25 and a source connected through resistors 43 and 44 to the ground. The gate of the FET 41 is connected through a resistor 42 to a connection node between the resistors 43 and 44.

Piezoelectric signals converted into low impedance by the impedance converter circuit 40 are outputted from the source of the FET 41 to be inputted through an electrolytic capacitor 51 to the level adjuster circuit 50. The level adjuster circuit 50 includes the coupling capacitor 51 and a variable resistor 52. The source of the FET 41 outputting the piezoelectric signals is connected through the coupling capacitor 51 and the variable resistor 52 to the ground. The maximum voltage level of the piezoelectric signals is applied between both ends of the variable resistor 52 to output the adjusted level of piezoelectric signals from a sliding electrode of the variable resistor 52.

The buffer amplifier 60 includes an FET 61 as a main circuit element, and the FET 61 has a gate receiving the piezoelectric signals adjusted with the level adjuster circuit 50 through a coupling capacitor 62. The FET 61 has a drain connected to the power line 25 and a source connected through resistors 64 and 65 in series to the ground. The gate of the FET 61 is connected through a resistor 63 to a connection node between the resistors 64 and 65. The source of the FET 61 functions as an output terminal of the buffer amplifier 60.

The low-pass filter 70 includes a variable resistor 71, an electrolytic capacitor 73, and a capacitor 72. Piezoelectric signals outputted from the buffer amplifier 60 is inputted through the variable resistor 71 to the low-pass filter 70, and only the low-frequency regions of the piezoelectric signals pass through the low-pass filter 70 via the electrolytic capacitor 73 and is inputted to the diaphragm 81 of the microphone unit 80. Characteristics of the low-pass filter 70 are adjusted with the variable resistor 71.

The operation of the condenser microphone in the embodiment will be described. The microphone unit 80 converts received sound waves into audio signals, and the impedance converter circuit 90 converts the audio signals into low impedance to output the signal. The impedance-converted audio signals are inputted to the base of the transistor 101 of two transistors 101 and 102 in the buffer 100 and are outputted from the emitter of the transistor 101 as a hot signal of the balanced output. The impedance-converted audio signals are outputted from the emitter of the other transistor 102 as a cold signal of the balanced output.

Now, it is assumed that mechanical vibration applied to the main body of the microphone causes vibration of the diaphragm 81 in the microphone unit 80 to generate vibratory noise signals which are not audio signals generated by vibration of sound waves. The vibratory noise signals are mixed into audio output signals without circuits for canceling the vibratory noise signals such as the piezoelectric element 30, the level adjuster circuit 50, and the low-pass filter 70. In this case, reproduced sound includes undesirable vibratory noise signals which are not audio signals. In accordance with the embodiment of the present invention shown in FIG. 1, piezoelectric signals are detected by the piezoelectric element 30, level-adjusted by the level adjuster circuit 50, and adjusted for low-frequency characteristics by the variable resistor 71, which thereby drives the diaphragm 81. In other words, the piezoelectric signals are added to the audio signal output of the microphone unit 80. Piezoelectric signals generated by applying mechanical vibration to the piezoelectric element 30 are inverted so as to have opposite polarities to vibratory noise signals in the microphone unit 80 generated by applying mechanical vibration, and the inverted piezoelectric signals are applied to the microphone unit 80 to thereby cancel the vibratory noise signals generated in the microphone unit 80.

In accordance with this embodiment, piezoelectric signals generated in the piezoelectric element 30 only have to be inputted to the microphone unit 80 to drive the diaphragm 81, and an adder or a subtractor is not necessary. Additionally, components such as a differential circuit used in Japanese Patent No. 2520929 are not necessary. A condenser microphone that can cancel vibratory noise signals can be therefore provided at low cost.

As described above, a narrow-directivity microphone including an acoustic tube tends to generate vibratory noise due to the mass of air in the acoustic tube. In a narrow-directivity microphone in accordance with the present invention, piezoelectric signals are level-adjusted with the level adjuster circuit 50 and low-frequency characteristics of the low-pass filter 70 are adjusted, which can thereby cancel vibratory noise signals effectively.

Industrial Applicability

The present invention is based on an electric vibrational noise canceller circuit, but mechanical vibration absorption may be used concomitantly. This can prevent vibratory noise signals more effectively.

The piezoelectric element in the present invention may be of any proper type such as monomorph, bimorph, or lamination.

What is claimed is:

1. A condenser microphone comprising:
a condenser microphone unit; and
a piezoelectric element,
wherein the piezoelectric element is disposed so as to generate piezoelectric signals in response to vibration causing the condenser microphone unit to generate vibratory noise signals,
the piezoelectric signals are inputted through a low-pass filter and a level adjuster circuit to the condenser microphone unit to drive a diaphragm of the condenser microphone unit, and
the vibratory noise signals are canceled with the piezoelectric signals generated by the piezoelectric element.

2. The condenser microphone according to claim 1,
wherein a weight is fixed to the piezoelectric element so as to generate acceleration in the direction of the vibration causing the condenser microphone unit to generate the vibratory noise signals.

3. The condenser microphone according to claim 2, wherein the piezoelectric element has a first end fixed to the condenser microphone unit and a second end fixed to the weight.

4. The condenser microphone according to claim 2, wherein a buffer amplifier is disposed between the low-pass filter and the level adjuster circuit.

5. The condenser microphone according to claim 2, wherein the low-pass filter includes a variable resistor.

6. The condenser microphone according to claim 1, wherein the piezoelectric signals driving the diaphragm of the condenser microphone unit have opposite polarities to the vibratory noise signals.

7. The condenser microphone according to claim 1, wherein the piezoelectric element has a first end fixed to the condenser microphone unit and a second end fixed to a weight.

8. The condenser microphone according to claim 1, wherein a buffer amplifier is disposed between the low-pass filter and the level adjuster circuit.

9. The condenser microphone according to claim 1, wherein the low-pass filter includes a variable resistor.

10. The condenser microphone according to claim 2, wherein the piezoelectric signals driving the diaphragm of the condenser microphone unit have opposite polarities to the vibratory noise signals.

* * * * *